US012754806B2

(12) United States Patent
Tseng

(10) Patent No.: US 12,754,806 B2
(45) Date of Patent: Oct. 6, 2026

(54) DATA PROCESSING DEVICE AND OPERATION METHOD THEREOF

(71) Applicant: Nuvoton Technology Corporation, Hsinchu Science Park (TW)

(72) Inventor: Po-Hsien Tseng, Hsinchu City (TW)

(73) Assignee: NUVOTON TECHNOLOGY CORPORATION, Hsinchu Sciencepark (TW)

( * ) Notice: Subject to any disclaimer, the term of this patent is extended or adjusted under 35 U.S.C. 154(b) by 243 days.

(21) Appl. No.: 18/296,116

(22) Filed: Apr. 5, 2023

(65) Prior Publication Data

US 2024/0070036 A1 Feb. 29, 2024

(30) Foreign Application Priority Data

Aug. 24, 2022 (TW) ................................. 111131844

(51) Int. Cl.

*G06F 11/14* (2026.01)
*G06F 3/06* (2006.01)
*G06F 11/1446* (2026.01)

(52) U.S. Cl.

CPC ........ *G06F 11/1469* (2013.01); *G06F 3/0619* (2013.01); *G06F 3/0656* (2013.01); *G06F 3/0673* (2013.01); *G06F 2201/84* (2013.01)

(58) Field of Classification Search

None

See application file for complete search history.

(56) References Cited

U.S. PATENT DOCUMENTS

| | | | | |
|---|---|---|---|---|
| 8,014,480 B1 * | 9/2011 | Zhuang | H03L 7/0807 | 375/350 |
| 11,740,961 B1 * | 8/2023 | Parashari | G06F 3/0688 | 714/6.24 |
| 2005/0207521 A1 * | 9/2005 | Lee | G06F 1/3287 | 375/355 |
| 2005/0264350 A1 * | 12/2005 | Lee | H03F 3/217 | 330/10 |

(Continued)

FOREIGN PATENT DOCUMENTS

| | | | |
|---|---|---|---|
| CN | 102841866 A | 12/2012 | |
| WO | WO-2004075067 A1 * | 9/2004 | G06F 13/4208 |

OTHER PUBLICATIONS

Taiwan Office Action dated Nov. 8, 2023 in Application No. 111131844 is attached, 6 pages.

*Primary Examiner* — Hosain T Alam
*Assistant Examiner* — Ryan Dare
(74) *Attorney, Agent, or Firm* — Muncy, Geissler, Olds & Lowe, P.C.

(57) ABSTRACT

A data processing device includes a data capturing module, a first counting module, a data moving module and a data recovery module. The data capturing module generates and temporarily stores N pieces of data according to an input signal and a first counting value, and generates a data moving instruction according to a second counting value and a first predetermined value. The first counting module generates the second counting value according to the N pieces of data. The data moving module moves the N pieces of data according to the data moving instruction. The data recovery module performs a recovery processing on the N pieces of data according to the second counting value to generate N pieces of recovery data.

18 Claims, 8 Drawing Sheets

(56) References Cited

U.S. PATENT DOCUMENTS

| | | | | |
|---|---|---|---|---|
| 2007/0174598 | A1* | 7/2007 | Thekkath | G06F 9/384<br>712/234 |
| 2007/0283062 | A1 | 12/2007 | Sato et al. | |
| 2016/0179715 | A1* | 6/2016 | Kaushik | G06F 13/28<br>710/308 |
| 2019/0235876 | A1* | 8/2019 | Fei | G06F 12/0875 |
| 2023/0098067 | A1* | 3/2023 | Kim | G09G 5/008<br>348/537 |
| 2023/0205710 | A1* | 6/2023 | Mambu | G06F 15/7821<br>710/308 |

* cited by examiner

| | | | | | | | | |
|---|---|---|---|---|---|---|---|---|
| CAPDAT0' | 0 | 0 | 0 | 0 | 0 | 0 | 0 | 0 |
| | 0 | 0 | 0 | 0 | 0 | 0 | 0 | 1 |
| CAPDAT1' | 0 | 0 | 0 | 0 | 0 | 0 | 0 | 0 |
| | 0 | 0 | 0 | 0 | 0 | 0 | 1 | 0 |
| CAPDAT2' | 0 | 0 | 0 | 0 | 0 | 0 | 0 | 0 |
| | 0 | 0 | 0 | 0 | 0 | 1 | 0 | 0 |
| CAPDAT3' | 0 | 0 | 0 | 0 | 0 | 0 | 0 | 0 |
| | 0 | 0 | 0 | 0 | 0 | 1 | 1 | 0 |
| CAPDAT4' | 0 | 0 | 0 | 0 | 0 | 0 | 0 | 0 |
| | 0 | 0 | 0 | 0 | 1 | 0 | 0 | 1 |

DATA PROCESSING DEVICE AND OPERATION METHOD THEREOF

CROSS REFERENCE TO RELATED APPLICATIONS

This application claims priority of Taiwan Patent Application No. 111131844, filed on Aug. 24, 2022, the entirety of which is incorporated by reference herein.

TECHNICAL FIELD

The present invention relates to a processing device and an operation method thereof, and in particular it relates to a data processing device and an operation method thereof.

BACKGROUND

In general, a micro controller unit may use a pulse width modulation (PWM) capturing module to capture an input signal to generate captured data, and uses the direct memory access (DMA) to move said captured data to the system memory. However, since it takes more time to move one piece of captured data to the system memory using direct memory access than it takes the pulse width modulation capturing module to capture the captured data corresponding to one signal change, the operational efficiency of overall data capturing is poor, and data may be lost.

The conventional method for solving the above problem is to increase the number of buffers, so as to temporarily store the captured data that may not be moved away by the direct memory access, i.e., one piece of data may need a buffer for temporary storage. Accordingly, more elements are used, and it may be inconvenient. Therefore, how to effectively increase the efficiency of data processing and reduce the number of elements that are used has become a focus of technical improvements.

SUMMARY

An embodiment of the present invention provides a data processing device and an operation method thereof, thereby effectively increasing the efficiency of data processing and reducing the number of elements that are used, so as to increase the convenience of use.

An embodiment of the present invention provides a data processing device, which includes a data capturing module, a first counting module, a data moving module and a data recovery module. The data capturing module is configured to receive an input signal, generate and temporarily store N pieces of data according to the input signal and a first counting value, and generate a data moving instruction according to a second counting value and a first predetermined value, wherein N is a positive integer greater than 1, and the bit number of the first data of the N pieces of data is greater than the bit numbers of the second data to the Nth data of the N pieces of data. The first counting module is configured to generate the second counting value according to the N pieces of data. The data moving module is configured to move the N pieces of data according to the data moving instruction. The data recovery module is configured to receive the N pieces of data and the second counting value, and perform a recovery processing on the N pieces of data according to the second counting value to generate N pieces of recovery data, wherein the bit numbers of the N pieces of recovery data are the same as the bit number of the first data.

An embodiment of the present invention provides an operation method of a data processing device, which includes the following steps. A data capturing module is used to receive an input signal, generate and temporarily store N pieces of data according to the input signal and a first counting value, and generate a data moving instruction according to a second counting value and a first predetermined value, wherein N is a positive integer greater than 1, and the bit number of the first data of the N pieces of data is greater than the bit numbers of the second data to the Nth data of the N pieces of data. A first counting module is used to generate the second counting value according to the N pieces of data. A data moving module is used to move the N pieces of data according to the data moving instruction. A data recovery module is used to receive the N pieces of data and the second counting value, and perform a recovery processing on the N pieces of data according to the second counting value to generate N pieces of recovery data, wherein the bit numbers of the N pieces of recovery data are the same as the bit number of the first data.

According to the data processing device and the operation method thereof disclosed by the present invention, the data capturing module receives the input signal, generates and temporarily stores the N pieces of data according to the input signal and the first counting value, and generates the data moving instruction according to the second counting value and the first predetermined value, wherein N is the positive integer greater than 1, and the bit number of the first data of the N pieces of data is greater than bit numbers of the second data to the Nth data of the N pieces of data. The first counting module generates the second counting value according to the N pieces of data. The data moving module moves the N pieces of data according to the data moving instruction. The data recovery module receives the N pieces of data and the second counting value, and perform the recovery processing on the N pieces of data according to the second counting value to generate N pieces of recovery data, wherein the bit numbers of the N pieces of recovery data are the same as the bit number of the first data. Therefore, the efficiency of data processing may be effectively increased and the number of elements that are used may be reduced, so as to increase the convenience of use.

BRIEF DESCRIPTION OF DRAWINGS

The present invention can be more fully understood by reading the subsequent detailed description and examples with references made to the accompanying drawings, wherein.

DETAILED DESCRIPTION OF DISCLOSED EMBODIMENTS

Figure 1:
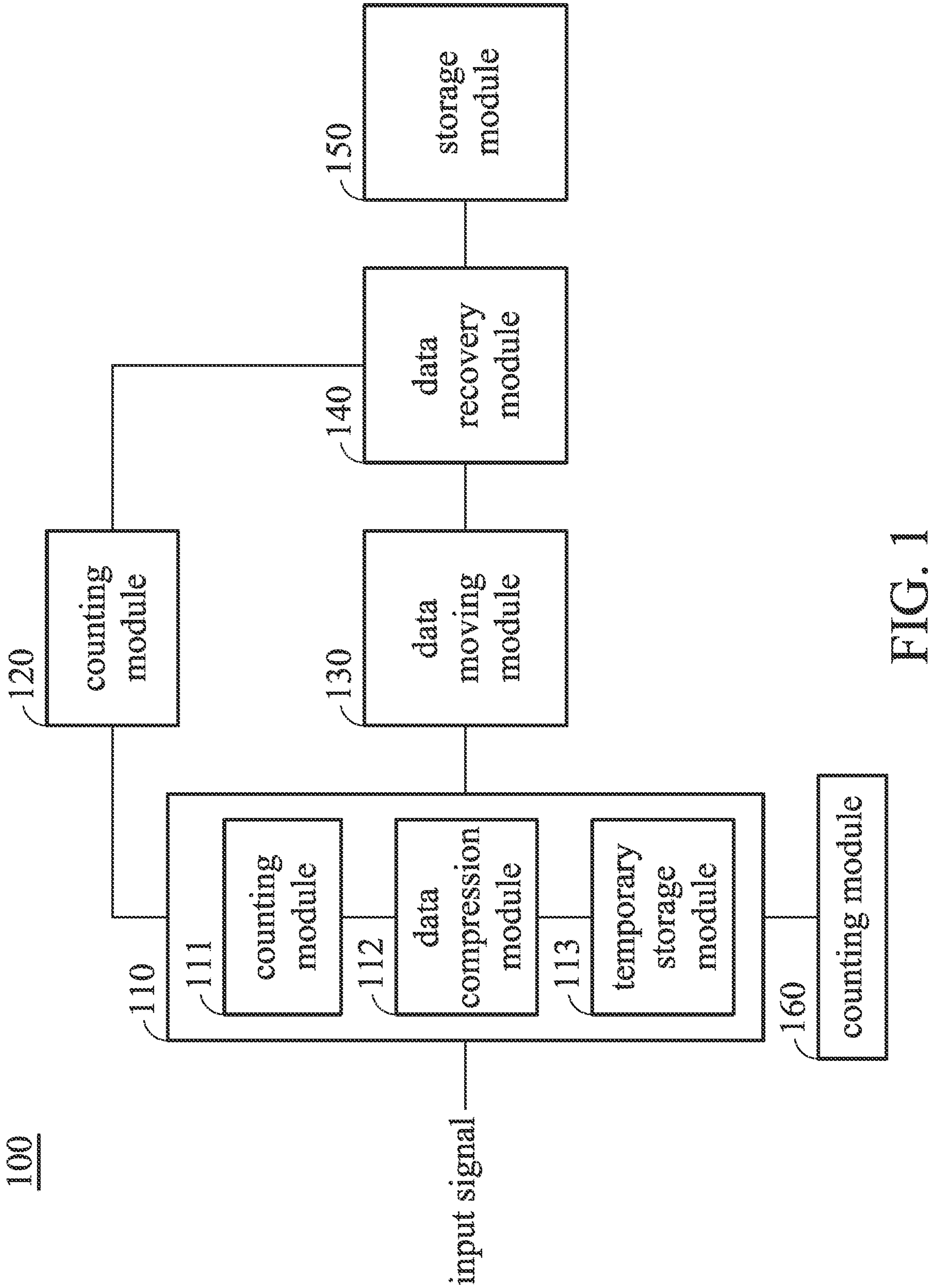
FIG. 1 is a schematic view of a data processing device according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It should be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It should be acknowledged that although the terms “first”, “second”, “third”, and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term “or” includes any and all combinations of one or more of the associated listed items.

It will be acknowledged that when an element or layer is referred to as being “on,” “connected to” or “coupled to” another element or layer, it can be directly on, connected or coupled to the other element or layer, or intervening elements or layers may be present. In contrast, when an element is referred to as being “directly on,” “directly connected to” or “directly coupled to” another element or layer, there are no intervening elements or layers present.

In addition, unless explicitly described to the contrary, the word “comprise” and variations such as “comprises” or “comprising”, will be acknowledged to imply the inclusion of stated elements but not the exclusion of any other elements.

In each of the following embodiments, the same reference number represents an element or component that is the same or similar.

FIG. 1 is a schematic view of a data processing device according to an embodiment of the present invention. Please refer to FIG. 1. The data processing device 100 may at least include a data capturing module 110, a counting module 120, a data moving module 130 and a data recovery module 140.

The data capturing module 110 receives an input signal, generates and temporarily store N pieces of data according to the input signal and a first counting value, and generates a data moving instruction according to a second counting value and a first predetermined value, wherein N is a positive integer greater than 1. In the embodiment, the bit number of the first data of the N pieces of data above is, for example, greater than the bit numbers of the second data to the Nth data of the N pieces of data. Furthermore, the bit number of the first data is $2^n$, and the bit numbers of the second data to the Nth data are n, wherein n is a positive integer greater than 1. For example, assuming n=4, the bit number of the first data is 16 ($2^4$), and the bit numbers of the second data to the Nth data are 4, i.e., the bit numbers of the second data to the Nth data are the lowest 4 bits of the 16 bits.

The counting module 120 is coupled to the data capturing module 110. The counting module 120 may generate the second counting value according to the N pieces of data. For example, when the data capturing module 110 generates the first data, the counting module 120 adds 1 in a counting-on method (such as 0+1), so as to generate the second counting value, such as “1”. Then, when the data capturing module 110 generates the second data, the counting module 120 adds 1 in the counting-on method (such as 1+1), so as to generate the second counting value, such as “2” . . . . Then, when the data capturing module 110 generates the Nth data, the counting module 120 adds 1 in the counting-on method (such as (N−1)+1), so as to generate the second counting value, such as “N”.

In addition, the data capturing module 110 may include a counting module 111, a data compression module 112 and a temporary storage module 113. The counting module 111 may generate the first counting value. In the embodiment, the counting module 111 is, for example, a counter.

The data compression module 112 is coupled to the counting module 111. The data compression module 112 receives the input signal and the first counting value, generates the N pieces of data according to the input signal and the first counting value, and generates the data moving instruction according to the second counting value and the first predetermined value. The temporary storage module 113 is coupled to the data compression module 112. The temporary storage module 113 temporarily stores the N pieces of data generated by the data compression module 112.

Figure 2:
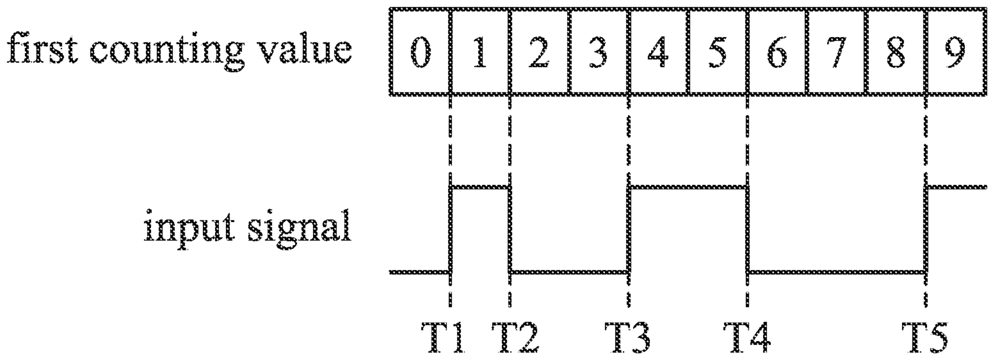
FIG. 2 is a schematic view of a corresponding relationship of an input single and a first counting value according to an embodiment of the present invention.

In the embodiment, the above N pieces of data are generated according to N signal changes of the input signal and the corresponding first counting value. Furthermore, the N signal changes of the input signal includes that the input signal is converted from a low logic level to a high logic level and from the high logic level to the low logic level. For example, it is assumed that the counting module 111 sequentially generates the first counting values “0”, “1”, “2”, “3”, “4”, “5”, “6”, “7”, “8” and“9” in the counting-on method, the input signal respectively generates the signal changes converted from a low logic level to a high logic level or form the high logic level to the low logic level at time T1, T2, T3, T4 and T5, as shown in FIG. 2. In addition, assuming n=4, the bit number of the first data is 16 ($2^4$), and the bit numbers of the second data to the Nth data are 4.

At time T1, the data compression module 112 detects that the input signal generates the signal change converted from the low logic level to the high logic level, and the data compression module 112 may obtain the first counting value corresponding to the signal change, such as “1”. Then, the data compression module 112 may capture the first counting value of “1” to generate the first data CAPDAT0, such as “0000000000000001”. At time T2, the data compression module 112 detects that the input signal generates the signal change converted from the high logic level to the low logic level, and the data compression module 112 may obtain the first counting value corresponding to the signal change, such as "2". Then, the data compression module 112 may capture the first counting value of "2" to generate the second data CAPDAT1, such as "0010".

At time T3, the data compression module 112 detects that the input signal generates the signal change converted from the low logic level to the high logic level, and the data compression module 112 may obtain the first counting value corresponding to the signal change, such as "4". Then, the data compression module 112 may capture the first counting value of "4" to generate the third data CAPDAT2, such as "0100". At time T4, the data compression module 112 detects that the input signal generates the signal change converted from the high logic level to the low logic level, and the data compression module 112 may obtain the first counting value corresponding to the signal change, such as "6". Then, the data compression module 112 may capture the first counting value of "6" to generate the fourth data CAPDAT3, such as "0110".

At time T5, the data compression module 112 detects that the input signal generates the signal change converted from the low logic level to the high logic level, and the data compression module 112 may obtain the first counting value corresponding to the signal change, such as "9". Then, the data compression module 112 may capture the first counting value of "9" to generate the fifth data CAPDAT4, such as "1001". Therefore, since the input signal generates five signal changes, the data compression module 112 may generates the five pieces of data, i.e., CAPDAT0-CAPDAT4.

Figure 3A:
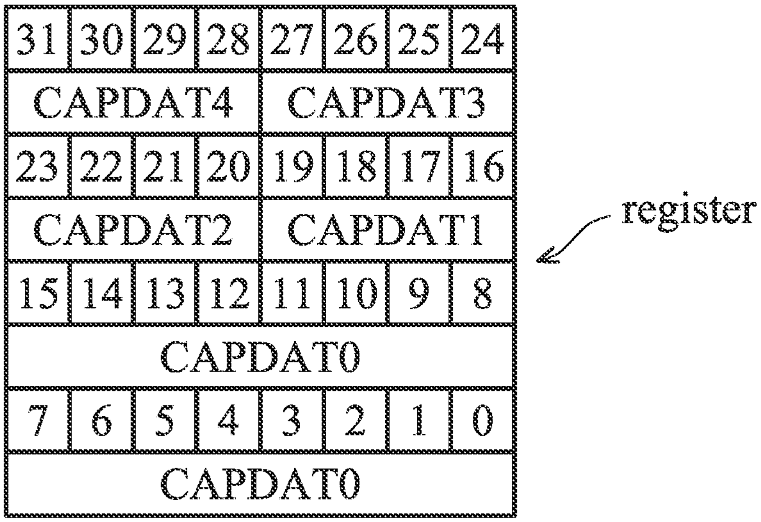
FIG. 3A is a schematic view of a temporary storage module according to an embodiment of the present invention.
Figure 3B:
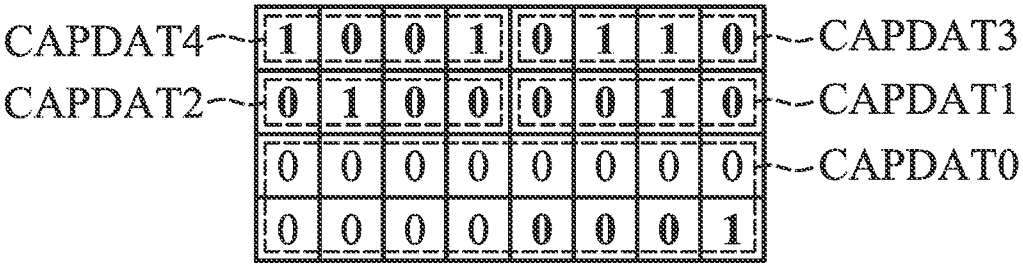
FIG. 3B is a schematic view of a form of data storage according to an embodiment of the present invention.

Afterward, the data compression module 112 may output the above five pieces of data (the data CAPDAT0-CAPDAT4) to the temporary storage module 113, to that the temporary storage module 113 temporarily stores the above data CAPDAT0-CAPDAT4. In some embodiments, the temporary storage module 113 may include a register, and the register is, for example, a 32-bit register, as shown in FIG. 3A. In addition, the form of the data CAPDAT0 of "0000000000000001", the data CAPDAT1 of "0010", the data CAPDAT2 of "0100", the data CAPDAT3 of "0110" and the data CAPDAT4 of "1001" stored in the register is shown in FIG. 3B. In FIG. 3A and FIG. 3B, it can be seen that the data CAPDAT0 of "0000000000000001" is stored in the 0th bit to 15th bit of the register, the data CAPDAT1 of "0010" is stored in the 16th bit to the 19th bit of the register, the data CAPDAT2 of "0100" is stored in the 20th bit to the 23th bit of the register, the data CAPDAT3 of "0110" is stored in the 24th bit to the 27 bit of the register, and the data CAPDAT4 of "1001" is stored in the 28th bit to the 31th bit.

Figure 3C:
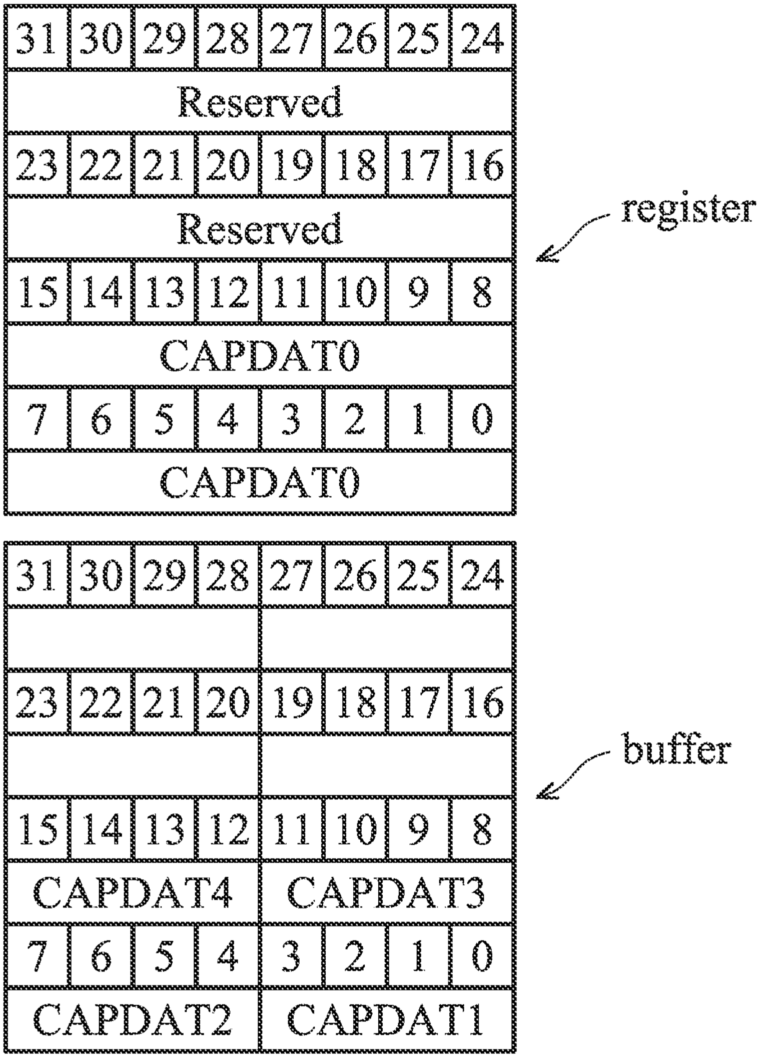
FIG. 3C is a schematic view of a temporary storage module according to another embodiment of the present invention.

In addition, in some embodiments, the temporary storage module 113 may include a register and a buffer, the above register is, for example, a 32-bit register, and the above buffer is, for example, a 32-bit buffer, as shown in FIG. 3C. The data CAPDAT0 is stored in the register, and the data CAPDAT1, the data CAPDAT2, the data CAPDAT3 and the data CAPDAT4 are stored in the buffer. In FIG. 3C, it can be seen that the data CAPDAT0 of "0000000000000001" is stored in the 0th bit to 15th bit of the register, the data CAPDAT1 of "0010" is stored in the 0th bit to the 3th bit of the buffer, the data CAPDAT2 of "0100" is stored in the 4th bit to 7th bit of the buffer, the data CAPDAT3 of "0110" is stored in the 8th bit to the 11th bit of the buffer, and the data CAPDAT4 of "1001" is stored in the 12th bit to the 15th bit of the buffer.

Then, when the data compression module 112 generates one piece of data each time, the data compression module 112 may generate a data moving instruction according to the second counting value generated by the counting module 120 and the first predetermined value. In the embodiment, the first predetermined value includes, for example, 1 or a data temporary storage number of the data capturing module 110 (such as the temporary storage number of the temporary storage module 113). Assuming that FIG. 3 is taken as an example, the data temporary storage number of the data capturing module 110 is 5, it indicates that the data capturing module 110 may temporarily store 5 pieces of data. In addition, assuming that FIG. 3C is taken as an example, the data temporary storage number of the data capturing module 110 is 9, it indicates that the data capturing module 110 may temporarily store 9 pieces of data (i.e., the register may store 1 piece of data and the buffer may store 8 pieces of data).

For example, when the data compression module 112 generates the first data CAPDAT0, the counting module 120 may generate, for example, the second counting value of "1". At this time, the data compression module 112 may obtain the second counting value of "1", and determine whether the second counting value of "1" is consistent with the first predetermined value (such as "1" or the data temporary storage number of the data capturing module 110). When the data compression module 112 determines that the second counting value of "1" is consistent with the first predetermined value (such as "1"), the data compression module 112 may generate the data moving instruction.

Then, when the data compression module 112 generates the second data CAPDAT1, the counting module 120 may generate, for example, the second counting value of "2". At this time, the data compression module 112 may obtain the second counting value of "2", and determine whether the second counting value of "2" is consistent with the first predetermined value (such as "1" or the data temporary storage number of the data capturing module 110). When the data compression module 112 determines that the second counting value of "2" is not consistent with the first predetermined value, the data compression module 112 may not generate the data moving instruction.

Afterward, when the data compression module 112 generates the third data CAPDAT2, the counting module 120 may generate, for example, the second counting value of "3". At this time, the data compression module 112 may obtain the second counting value of "3", and determine whether the second counting value of "3" is consistent with the first predetermined value (such as "1" or the data temporary storage number of the data capturing module 110). When the data compression module 112 determines that the second counting value of "3" is not consistent with the first predetermined value, the data compression module 112 may not generate the data moving instruction.

Then, when the data compression module 112 generates the fourth data CAPDAT3, the counting module 120 may generate, for example, the second counting value of "4". At this time, the data compression module 112 may obtain the second counting value of "4", and determine whether the second counting value of "4" is consistent with the first predetermined value (such as "1" or the data temporary storage number of the data capturing module 110). When the data compression module 112 determines that the second counting value of "4" is not consistent with the first predetermined value, the data compression module 112 may not generate the data moving instruction.

Then, when the data compression module 112 generates the fifth data CAPDAT4, the counting module 120 may generate, for example, the second counting value of "5". At this time, the data compression module 112 may obtain the second counting value of "5", and determine whether the second counting value of "5" is consistent with the first predetermined value (such as "1" or the data temporary storage number of the data capturing module 110). Assuming that FIG. 3A is taken as an example, when the data compression module 112 determines that the second counting value of "5" is consistent with the first predetermined value (such as the data temporary storage number "5" of the data capturing module 110), the data compression module 112 may generate the data moving instruction. In addition, assuming that FIG. 3C is taken as an example, when the data compression module 112 determines that the second counting value of "5" is not consistent with the first predetermined value (such as the data temporary storage number "9" of the data capturing module 110), the data compression module 112 may not generate the data moving instruction.

The data moving module 130 is coupled to the data capturing module 110. The data moving module 130 receives the data moving instruction generated by the data capturing module 110, and move the N pieces of data temporarily stored in the data capturing module according to the data moving instruction. In the embodiment, the data moving module 130 is, for example, a direct memory access (DMA), but the embodiment of the present invention is not limited thereto. Assuming that FIG. 3A is taken as an example, when the data moving module 130 receives the data moving instruction generated by the data capturing module 110, the data moving module 130 may move the 5 pieces of data (such as the data CAPDAT0-CAPDAT4) of the temporary storage module 113 at one time. Assuming that FIG. 3C is taken as an example, when the data moving module 130 receives the data moving instruction generated by the data capturing module 110, the data moving module 130 may first move the first data (such as the data CAPDAT0) of the register of the temporary storage module 113, and then move the second data to the fifth data (such as the data CAPDAT1-CAPDAT4) of the buffer of the temporary storage module 113. Therefore, the efficiency of data processing may be effectively increased and the number of elements that are used may be reduced, so as to increase the convenience of use.

The data recovery module 140 is coupled to the data moving module 130 and the counting module 120. The data recovery module 140 receives the N pieces of data moved by the data moving module 130 and the second counting value generated by the counting module, and performs a recovery processing on the N pieces of data according to the second counting value to generate N pieces of recovery data, wherein the bit numbers of the N pieces of recovery data are the same as the bit number of the first data.

In the embodiment, the data recovery module 140 may perform a logic operation on the N pieces of data to generate the corresponding N pieces of recovery data. For example, the data recovery module 140 may perform a first logic operation on the first data and a low logic level signal (such as "0") to generate a corresponding processing signal. Then, the data recovery module 140 performs a second logic operation on the above processing signal with the first data to the Nth data respectively, so as to generate the N pieces of recovery data. In the embodiment, the bit number of the above low logic level signal is the same as the bit numbers of the second data to the Nth data.

Figures 4, 5:
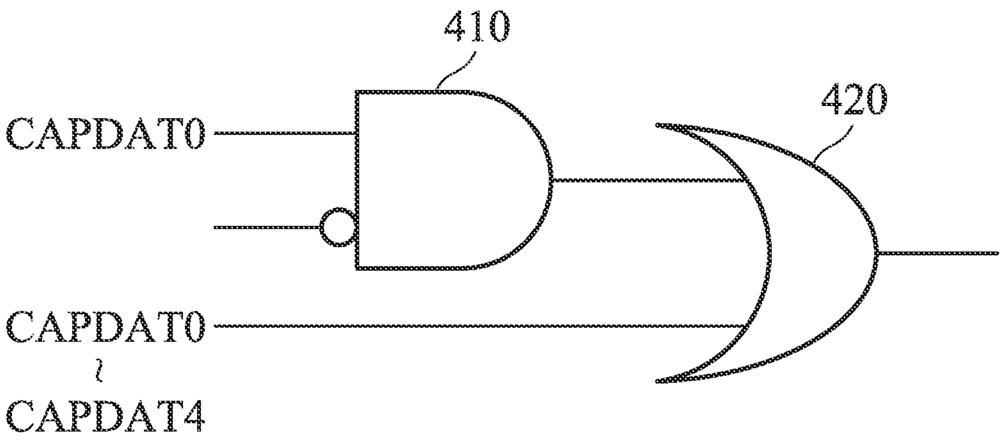
FIG. 4 is a schematic circuit diagram of a data recovery module according to an embodiment of the present invention.
FIG. 5 is a schematic view of recovery data according to an embodiment of the present invention.

Furthermore, the data recovery module 140 may include an AND gate 410 and an OR gate 420, as shown in FIG. 4. The AND gate 410 includes a first input terminal, a second input terminal and an output terminal. The first input terminal of the AND gate 410 receives the first data. The second input terminal of the AND gate 410 receives a low logic level signal, such as "0". The output terminal of the AND gate 410 generates processing data. In the embodiment, the bit number of the above low logic level signal is the same as the bit numbers of the N pieces of data.

The OR gate 420 includes a first input terminal, a second input terminal and an output terminal. The first input terminal of the OR gate 420 receives the processing data. The second input terminal of the OR gate 420 receives the N pieces of data in sequence. The output terminal of the OR gate 420 generates the N pieces of recovery data.

For example, N is 5, the bit number of the low logic level signal is, for example, 4, and the low logic level signal is, for example, "0000". The AND gate 410 receives, for example, the first data CAPDAT1 of "0000000000000001" and the low logic level signal of "0000", and perform an "AND" operation on the first data "0000000000000001" and the low logic level signal of "0000", so as to generate, for example, the processing signal of "0000000000000000".

Then, the OR gate 420 receives the processing signal of "0000000000000000" and the first data CAPDAT0 of "0000000000000001", and perform an "OR" operation on the processing signal of "0000000000000000" and the first data CAPDAT0 of "0000000000000001", so as to generate, for example, the recovery data CAPDAT0' of "0000000000000001", as shown in FIG. 5.

Afterward, the OR gate 420 receives the processing signal of "0000000000000000" and the second data CAPDAT1 of "0010", and perform an "OR" operation on the processing signal of "0000000000000000" and the second data CAPDAT1 of "0010", so as to generate, for example, the recovery data CAPDAT1' of "0000000000000010", as shown in FIG. 5.

Then, the OR gate 420 receives the processing signal of "0000000000000000" and the third data CAPDAT2 of "0100", and perform an "OR" operation on the processing signal of "0000000000000000" and the third data CAPDAT2 of "0100", so as to generate, for example, the recovery data CAPDAT2' of "0000000000000100", as shown in FIG. 5.

Afterward, the OR gate 420 receives the processing signal of "0000000000000000" and the fourth data CAPDAT3 of "0110", and perform an "OR" operation on the processing signal of "0000000000000000" and the fourth data CAPDAT3 of "0110", so as to generate, for example, the recovery data CAPDAT3' of "0000000000000110", as shown in FIG. 5.

Then, the OR gate 420 receives the processing signal of "0000000000000000" and the fifth data CAPDAT4 of "1001", and perform an "OR" operation on the processing signal of "0000000000000000" and the fifth data CAPDAT4 of "1001", so as to generate, for example, the recovery data CAPDAT4' of "0000000000001001", as shown in FIG. 5. Therefore, the data recovery module 140 may effectively recover the data generated by the data capturing module 110 to the original data with the same bit number and no distortion, so as to increase the processing speed of data.

Then, after the data recovery module 140 generate the recovery data, the data capturing module 110 may determine whether the second counting value of the counting module 120 is greater than a predetermined value (such as "1"). When the data capturing module 110 determines that the second counting value is not greater than the above predetermined value (such as "1"), the data capturing module 110 may not clear the second counting value to "0". When the data capturing module 110 determines that the second counting value is greater than the above predetermined value (such as "1"), the data capturing module 110 may clear the second counting value to "0" for subsequent data capturing operation.

In the embodiment, the data processing device 100 further includes a storage module 150. The storage module 150 is coupled to the data recovery module 140. The storage module 150 receives and stores the N pieces of recovery data generated by the data recovery module 140, as shown in FIG. 5. In the embodiment, the storage module 150 is, for example, a static random access memory (SRAM), but the embodiment of the present invention is not limited thereto.

In addition, in the embodiment, the data processing deice 100 further includes a counting module 160. The counting module 160 is coupled to the data capturing module 110. The counting module 160 may generate a third counting value according to the data capturing clock period of the data capturing module 110. The data capturing module 110 further generates the data moving instruction according to the third counting value and a second predetermined value, wherein the second predetermined value is the upper limit of the data capturing clock period. That is, when the data capturing module 110 obtains the third counting value of the counting module 160, the data capturing module 110 may determine whether the third counting value is consistent with the second predetermined value.

When the data capturing module 110 determines that the third counting value is not consistent with the second predetermined value, it indicates that the third counting value does not reach the upper limit of the data capturing clock period, and the data capturing module 110 may not generate the data moving instruction to the data moving module 130. When the data capturing module 110 determines that the third counting value is consistent with the second predetermined value, it indicates that the third counting value reaches the upper limit of the data capturing clock period, and the data capturing module 110 may generate the data moving instruction to the data moving module 130, so that the data moving module 130 moves the data generated by the data capturing module 110 to the data recovery module 140.

That is, assuming that FIG. 3C is taken as an example, when the data compression module 112 determines that the second counting value of "5" is not consistent with the first predetermined value (such as the data temporary storage number "9" of the data capturing module 110), the data compression module 112 may not generate the data moving instruction. Then, when the data capturing module 110 determines that the third counting value is consistent with the second counting value, the data capturing module 110 may generate the data moving instruction to the data moving module 130, so that the data moving module 130 moves the five pieces of data CAPDAT0-CAPDAT4 generated by the data capturing module 110 to the data recovery module 140.

Figure 6:
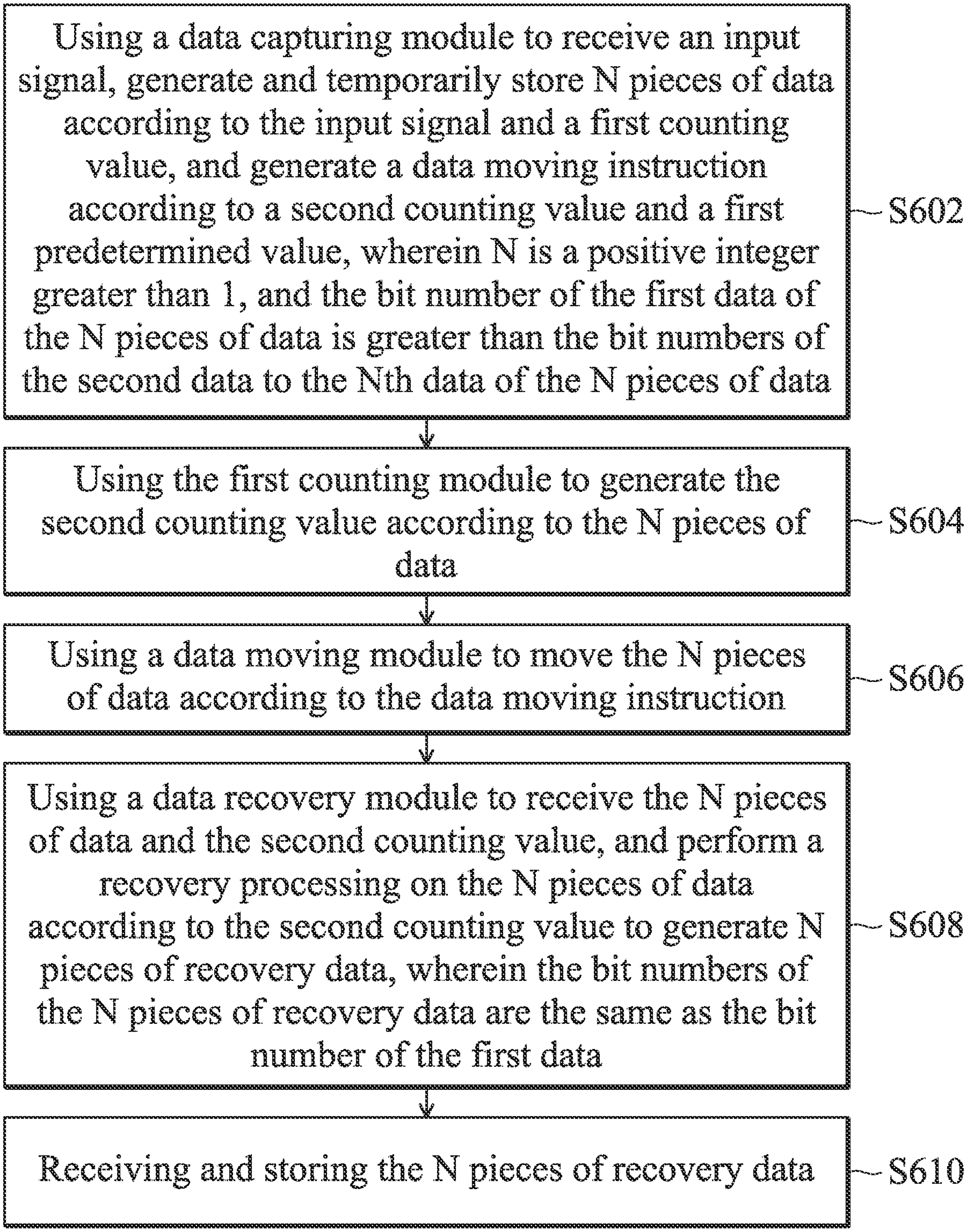
FIG. 6 is a flowchart of an operation method of a data processing device according to an embodiment of the present invention.

FIG. 6 is a flowchart of an operation method of a data processing device according to an embodiment of the present invention. In step S602, the method involves. using a data capturing module to receive an input signal, generate and temporarily store N pieces of data according to the input signal and a first counting value, and generate a data moving instruction according to a second counting value and a first predetermined value, wherein N is a positive integer greater than 1, and the bit number of the first data of the N pieces of data is greater than the bit numbers of the second data to the Nth data of the N pieces of data. In step S604, the method involves using the first counting module to generate the second counting value according to the N pieces of data.

In step S606, the method involves using a data moving module to move the N pieces of data according to the data moving instruction. In step S608, the method involves using a data recovery module to receive the N pieces of data and the second counting value, and perform a recovery processing on the N pieces of data according to the second counting value to generate N pieces of recovery data, wherein the bit numbers of the N pieces of recovery data are the same as the bit number of the first data. In step S610, the method involves receiving and storing the N pieces of recovery data.

In some embodiments, the above data capturing module includes, for example, a register, and the register is configured to store the N pieces of data. In some embodiments, the above data capturing module includes, for example, a register and a buffer, the register is configured to store the first data, and the buffer is configured to store the second data to the Nth data. In some embodiments, the bit number of the first data is 2n, and the bit numbers of the second data to the Nth data are n, wherein n is a positive integer greater than 1. In some embodiments, the above N pieces of data are generated according to N signal changes of the input signal and the corresponding first counting value. In some embodiments, the N signal changes of the input signal includes that, for example, the input signal is converted from a low logic level to a high logic level and from the high logic level to the low logic level. In some embodiments, the first predetermined value includes, for example, 1 or a data temporary storage number of the data capturing module.

Figure 7:
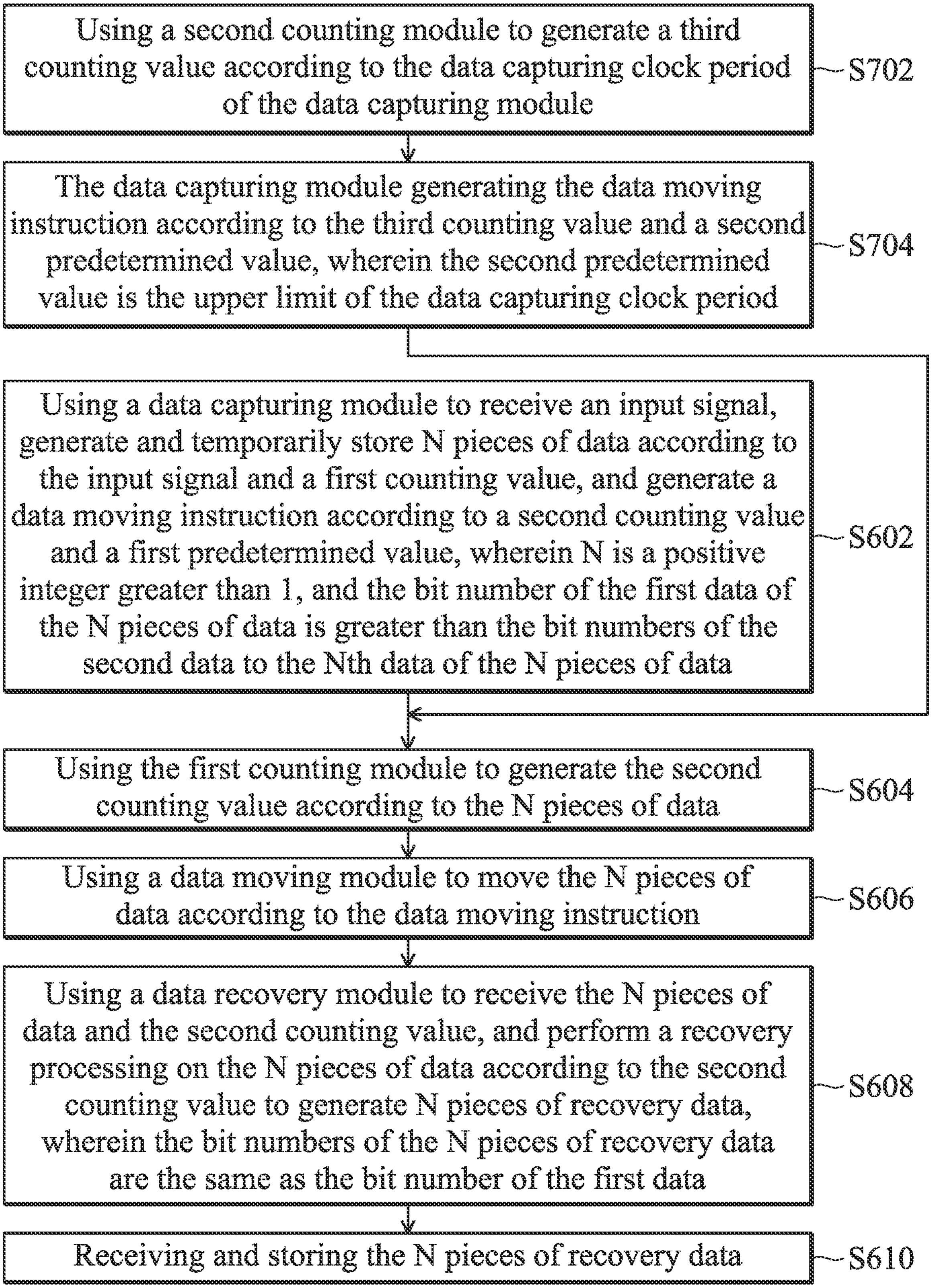
FIG. 7 is a flowchart of an operation method of a data processing device according to another embodiment of the present invention.

FIG. 7 is a flowchart of an operation method of a data processing device according to another embodiment of the present invention. In the embodiment, steps S602-S610 in FIG. 7 are the same as or similar to steps S602-S610 in FIG. 6. Accordingly, steps S602-S610 in FIG. 7 may refer to the description of the embodiment in FIG. 6, and the description thereof is not repeated herein.

In step S702, the method involves using a second counting module to generate a third counting value according to the data capturing clock period of the data capturing module. In step S704, the method involves the data capturing module generating the data moving instruction according to the third counting value and a second predetermined value, wherein the second predetermined value is the upper limit of the data capturing clock period.

Figure 8:
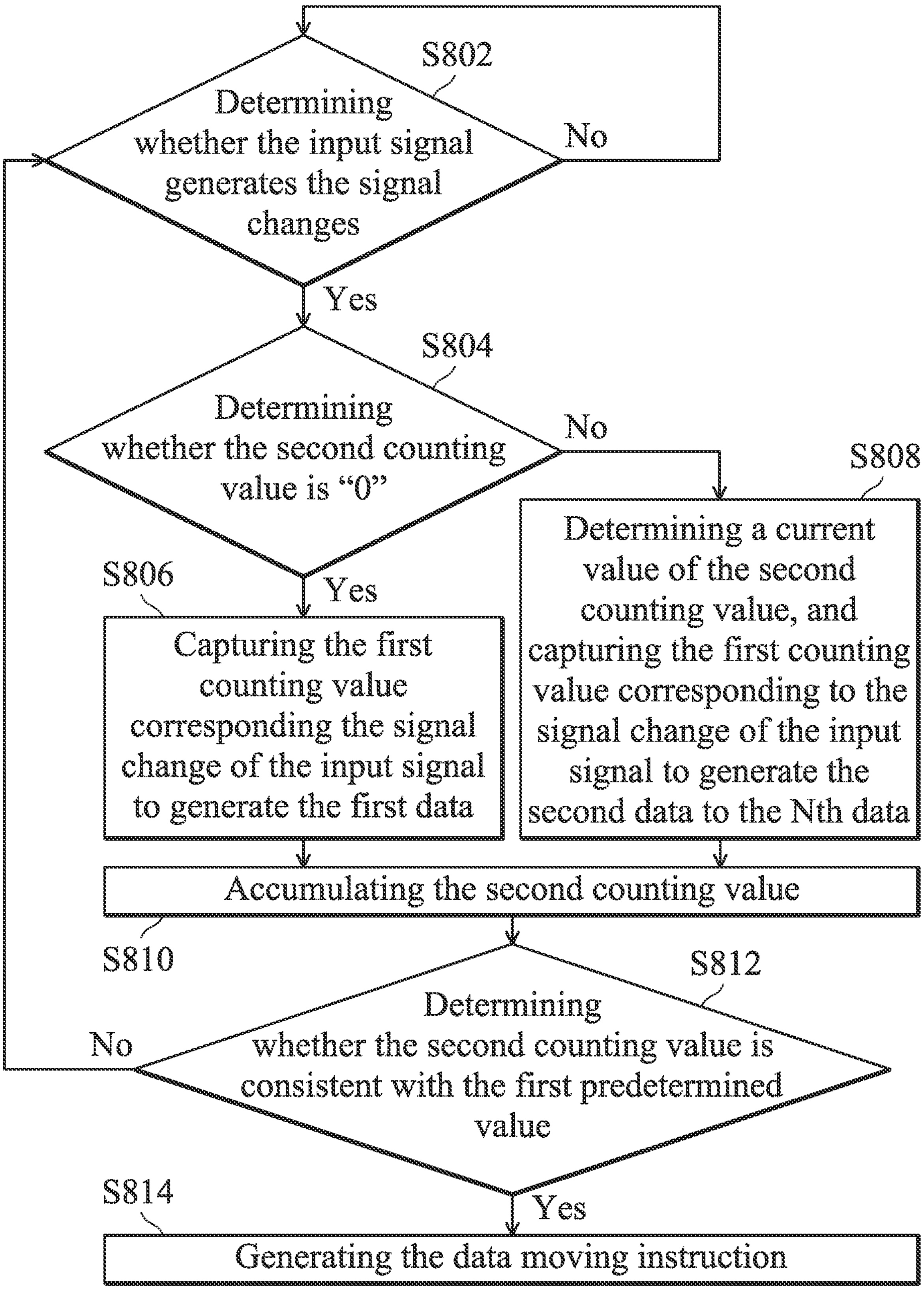
FIG. 8 is a detailed flowchart of step S602 in FIG. 6.

FIG. 8 is a detailed flowchart of step S602 in FIG. 6. In step S802, the method involves determining whether the input signal generates the signal changes. When determining that the input signal does not generate the signal change, the method returns to step S802, so as to continuously determine whether the input signal generate the signal change. When determining that the input signal generates the signal change, the method enters step S804. In step S804, the method involves determining whether the second counting value is "0". When determining that the second counting value is "0", the method enters step S806. In step S806, the method involves capturing the first counting value corresponding the signal change of the input signal to generate the first data.

When determining that the second counting value is not "0", the method enters step S808. In step S808, the method involves determining a current value of the second counting value, and capturing the first counting value corresponding to the signal change of the input signal to generate the second data to the Nth data. For example, when the current value of the second counting value "1", the second data is generated in step S808. When the current value of the second counting value is "2", the third data is generated in step S808. The manner for generating the other data may be deduced by analogy.

In step S810, the method involves accumulating the second counting value, for example, adding "1" to the current value of the second counting value. In step S812, the method involves determining whether the second counting value is consistent with the first predetermined value. When determining that the second counting value is consistent with the first predetermined value, the method enters step S814. In step S814, the method involves generating the data moving instruction. When determining that the second counting value is not consistent with the first predetermined value, the method returns to step S802, so as to determine whether the input signal generates the signal change again.

It should be noted that the order of the steps of FIG. 6, FIG. 7 and FIG. 8 is only for illustrative purpose, but not intended to limit the order of the steps of the present invention. The user may change the order of the steps above according the requirement thereof. The flowcharts described above may add additional steps or use fewer steps without departing from the spirit and scope of the present invention.

In summary, according to the data processing device and the operation method thereof disclosed by the embodiment of the present invention, the data capturing module receives the input signal, generates and temporarily stores the N pieces of data according to the input signal and the first counting value, and generates the data moving instruction according to the second counting value and the first predetermined value, wherein N is the positive integer greater than 1, and the bit number of the first data of the N pieces of data is greater than bit numbers of the second data to the Nth data of the N pieces of data. The first counting module generates the second counting value according to the N pieces of data. The data moving module moves the N pieces of data according to the data moving instruction. The data recovery module receives the N pieces of data and the second counting value, and perform the recovery processing on the N pieces of data according to the second counting value to generate N pieces of recovery data, wherein the bit numbers of the N pieces of recovery data are the same as the bit number of the first data. In addition, in the embodiment, the second counting module is further used to generate the third counting value according to the data capturing clock period of the data capturing module, and the data capturing module further generates the data moving instruction according to the third counting value and the second predetermined value, wherein the second predetermined value is the upper limit of the data capturing clock period. Therefore, the efficiency of data processing may be effectively increased, the number of elements that are used may be reduced, so as to increase the convenience of use.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A data processing device, comprising:

a data capturing module, configured to receive an input signal, generate and temporarily store N pieces of data according to the input signal and a first counting value, and generate a data moving instruction according to a second counting value and a first predetermined value, wherein N is a positive integer greater than 1, and a bit number of a first data of the N pieces of data is greater than bit numbers of a second data to an Nth data of the N pieces of data;

a first counting module, configured to generate the second counting value according to the N pieces of data;

a data moving module, configured to move the N pieces of data according to the data moving instruction; and a data recovery module, configured to receive the N pieces of data and the second counting value, and perform a recovery processing on the N pieces of data according to the second counting value to generate N pieces of recovery data, wherein the bit numbers of the N pieces of recovery data are the same as the bit number of the first data;

wherein the bit number of the first data is $2^n$, and the bit numbers of the second data to the Nth data are n, wherein n is a positive integer greater than 1;

wherein the N pieces of data are generated according to N signal changes of the input signal and the corresponding first counting value.

2. The data processing device as claimed in claim 1, further comprising:

a storage module, configured to receive and store the N pieces of recovery data.

3. The data processing device as claimed in claim 1, wherein the data capturing module comprises:

a second counting module, configured to generate the first counting value;

a data compression module, configured to receive the input signal, generate the N pieces of data according to the input signal and the first counting value, and generate the data moving instruction according to the second counting value and the first predetermined value; and a temporary storage module, configured to temporarily store the N pieces of data.

4. The data processing device as claimed in claim 3, wherein the temporary storage module comprises a register, and the register is configured to store the N pieces of data.

5. The data processing device as claimed in claim 3, wherein the temporary storage module comprises a register and a buffer, the register is configured to store the first data, and the buffer is configured to store the second data to the Nth data.

6. The data processing device as claimed in claim 3, wherein the first counting module and the second counting module are counters.

7. The data processing device as claimed in claim 1, wherein the N signal changes of the input signal comprises that the input signal is converted from a low logic level to a high logic level and from the high logic level to the low logic level.

8. The data processing device as claimed in claim 1, wherein the first predetermined value comprises 1 or a data temporary storage number of the data capturing module.

9. The data processing device as claimed in claim 1, further comprising:

a second counting module, configured to generate a third counting value according to a data capturing clock period of the data capturing module;

wherein the data capturing module is further configured to generate the data moving instruction according to the third counting value and a second predetermined value, wherein the second predetermined value is an upper limit of the data capturing clock period.

10. The data processing device as claimed in claim 1, wherein the data recovery module comprises:

an AND gate, comprising a first input terminal, a second input terminal and a first output terminal, wherein the first input terminal of the AND gate receives the first data, the second input terminal of the AND gate receives a low logic level signal, the first output terminal of the AND gate generates processing data, and a bit number of the low logic level signal is the same as the bit numbers of the second data to the Nth data; and an OR gate, comprising a third input terminal, a fourth input terminal and a second output terminal, wherein the third input terminal of the OR gate receives the processing data, the fourth input terminal of the OR gate receives the N pieces of data in sequence, and the second output terminal of the OR gate generates the N pieces of recovery data.

11. An operation method of a data processing device, comprising:

using a data capturing module to receive an input signal, generate and temporarily store N pieces of data according to the input signal and a first counting value, and generate a data moving instruction according to a second counting value and a first predetermined value, wherein N is a positive integer greater than 1, and a bit number of a first data of the N pieces of data is greater than bit numbers of a second data to an Nth data of the N pieces of data;

using a first counting module to generate the second counting value according to the N pieces of data;

using a data moving module to move the N pieces of data according to the data moving instruction; and using a data recovery module to receive the N pieces of data and the second counting value, and perform a recovery processing on the N pieces of data according to the second counting value to generate N pieces of recovery data, wherein the bit numbers of the N pieces of recovery data are the same as the bit number of the first data;

wherein the bit number of the first data is $2^n$, and the bit numbers of the second data to the Nth data are n, wherein n is a positive integer greater than 1;

wherein the N pieces of data are generated according to N signal changes of the input signal and the corresponding first counting value.

12. The operation method of the data processing device as claimed in claim 11, further comprising:

receiving and storing the N pieces of recovery data.

13. The operation method of the data processing device as claimed in claim 11, wherein the data capturing module comprises a register, and the register is configured to store the N pieces of data.

14. The operation method of the data processing device as claimed in claim 11, wherein the data capturing module comprises a register and a buffer, the register is configured to store the first data, and the buffer is configured to store the second data to the Nth data.

15. The operation method of the data processing device as claimed in claim 11, wherein the N signal changes of the input signal comprises that the input signal is converted from a low logic level to a high logic level and from the high logic level to the low logic level.

16. The operation method of the data processing device as claimed in claim 11, wherein the first predetermined value comprises 1 or a data temporary storage number of the data capturing module.

17. The operation method of the data processing device as claimed in claim 11, further comprising:

using a second counting module to generate a third counting value according to a data capturing clock period of the data capturing module; and the data capturing module generating the data moving instruction according to the third counting value and a second predetermined value, wherein the second predetermined value is an upper limit of the data capturing clock period.

18. The operation method of the data processing device as claimed in claim 17, wherein the first counting module and the second counting module are counters.

* * * * *